No. 741,167. PATENTED OCT. 13, 1903.
P. W. ROBINSON.
GATE.
APPLICATION FILED MAR. 7, 1903.
NO MODEL. 2 SHEETS—SHEET 2.
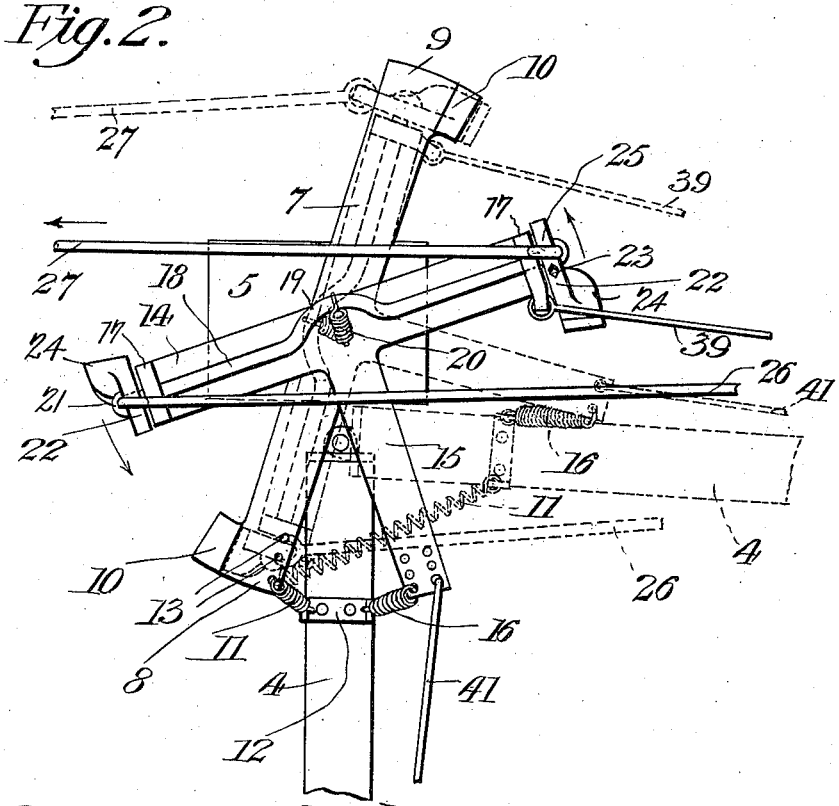
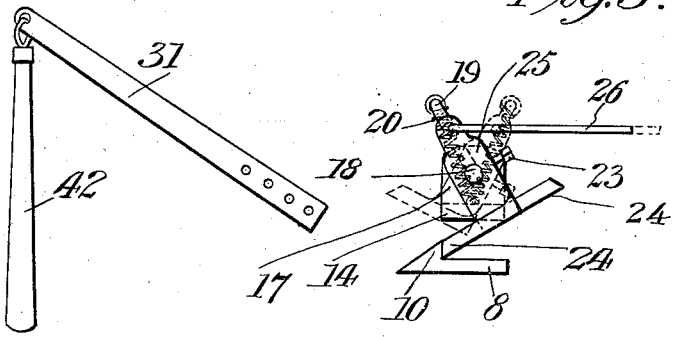
Witnesses
P. W. Robinson Inventor
by C. A. Snow & Co.
Attorneys No. 741,167. Patented October 13, 1903.

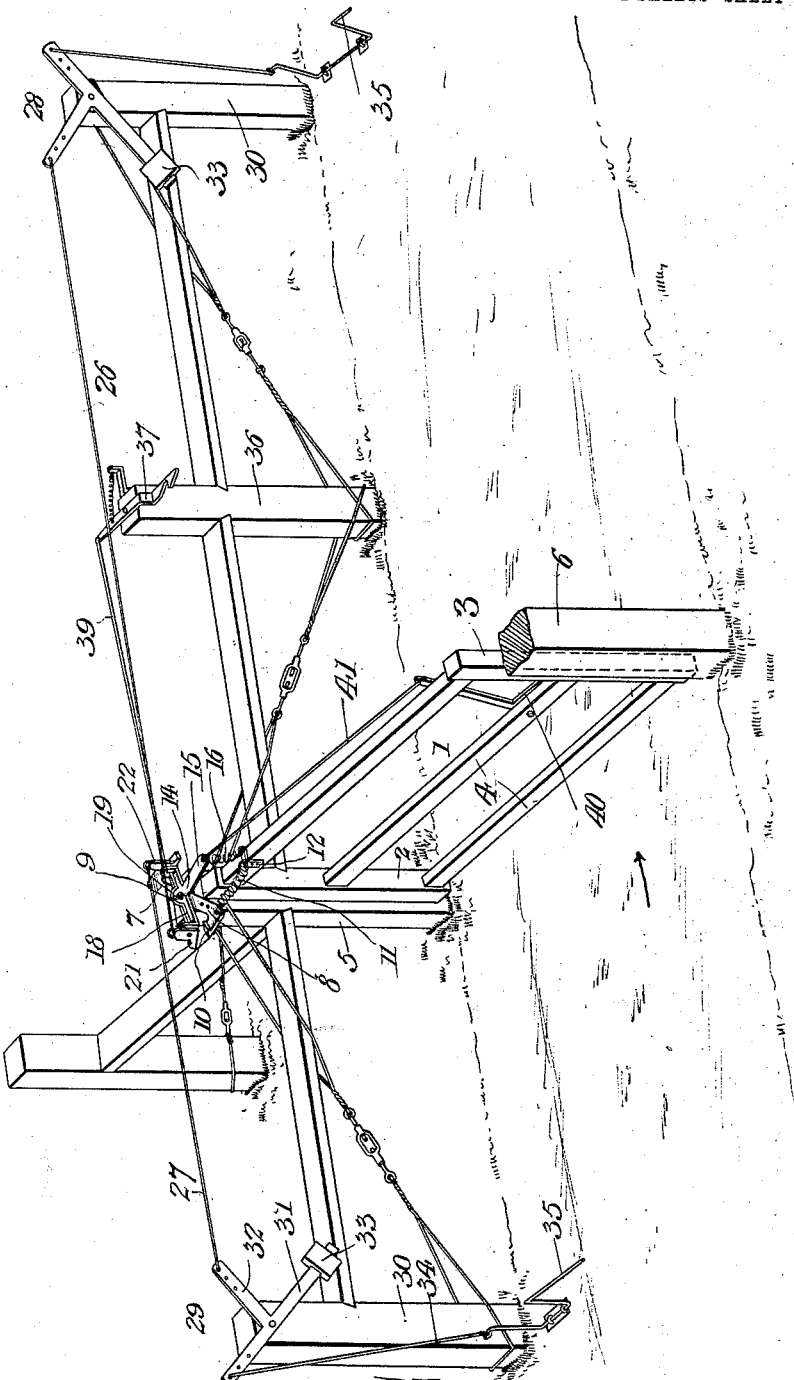

UNITED STATES PATENT OFFICE.

PHILIP W. ROBINSON, OF LAKEWOOD, ILLINOIS.

GATE.

SPECIFICATION forming part of Letters Patent No. 741,167, dated October 13, 1903.

Application filed March 7, 1903. Serial No. 146,746. (No model.)

*To all whom it may concern:*

Be it known that I, PHILIP W. ROBINSON, a citizen of the United States, residing at Lakewood, in the county of Shelby and State of Illinois, have invented a new and useful Gate, of which the following is a specification.

My invention relates to gates, and has for its objects to produce a device of this character which will be simple of construction, inexpensive to manufacture, one having means readily manipulated for opening or closing the same, said opening and closing means being efficient in operation and capable of manipulation at points distant from either side of the gate.

To these ends the invention comprises the details of construction and combination of parts more fully hereinafter described and claimed.

In the accompanying drawings, Figure 1 is a perspective view of a gate comprising my improved operating means. Fig. 2 is a fragmentary view illustrating in plan the hinge-post, a portion of the gate, and the adjacent operating mechanism. Fig. 3 is a detailed view of the latch members for locking the gate in its open position, illustrating their relative arrangement. Fig. 4 is a detailed view of a lever for operating the parts and adapted to be substituted for the trip member.

Referring to the drawings, 1 indicates a gate having the usual vertical end bars 2 and 3, connected by suitable horizontal bars or slats 4.

5 and 6 indicate, respectively, an inner and outer post, to the former of which the gate is pivoted in any suitable manner so as to swing in a horizontal plane from a closed position between the posts to an open position, the opening and closing of the gate being effected by improved mechanism now to be described.

It is to be understood that the above-mentioned parts may all be of the usual or any desired construction and of any suitable material, inasmuch as they constitute no part of the present invention.

In my improved gate-operating mechanism 7 indicates a fixed latch-plate in the form of a horizontal arm secured to the top of the post in any suitable manner and provided with lateral oppositely-disposed arms 8 and 9, having near their outer ends suitable catches 10. This latch-plate is disposed across the top of the post at an angle to the central line of the gate when closed and is connected with the gate by a spring 11, secured to a clip 12, fixed to the top bar of the gate and to the latch-plate by means of a hook adapted to engage any one of a series of perforations 13, whereby the tension of the spring may be adjusted by transferring its point of attachment from one perforation to another, as is obvious.

14 indicates a movable gate-operating member in the form of a metal plate pivoted centrally to the gate-post and provided with a central right-angularly-disposed horizontal arm 15, connected with the clip 12 by a spring 16, the function of which will be hereinafter described. The body portion of the gate-operating member 14 is provided at its ends with transverse vertically-disposed ears 17, perforated to receive the ends of a rod 18, pivoted therein and provided with a central crank-bend 19, connected at its central point with the member 14 by a spring 20. The ends of the rod project slightly beyond the ears 17 and have mounted thereon movable latch members 21 22, adjustably secured to the rod by set-screws 23. These latch members each comprise a horizontal engaging arm 24 and a right-angularly-disposed operating-arm 25, the latter connected by a wire, rope, or the like 26 27, respectively, with operating-levers 28 29. As each of these operating-levers is identical in construction and operation, it will be necessary to describe but one in detail. Each lever is pivoted in any suitable manner to the side face of a sustaining-post 30 and comprises a main lever-arm 31 and a right-angularly-disposed arm 32, the arm 32 being connected by the wire 27 with the movable latch member, while the main lever-arm is provided at one end with a weight 33 and is connected at its other end by a wire or the like 34 with a trip member 35, adapted to be operated by the wheels of a vehicle in the usual manner.

The gate swings on its pivot in but one direction for opening, and when opened its outer or free end contacts with a post 36, provided with a latch member 37, adapted to engage the outer end bar of the gate. This latch member is connected by a wire 39 with the operating member 14, whereby when the member is actuated to open or close the gate the latch member will be simultaneously operated to engage or release the same. The gate is further provided with a latch member 40, which when the gate is closed engages a suitable latch-socket carried by the post 6. This member is connected by a wire 41 with and is actuated by the gate-operating member 14.

The operation of the device is as follows: Supposing the parts to be in the position shown in Fig. 1 with the gate closed and a vehicle to be approaching in the direction indicated by the arrow, the wheel of the vehicle will engage with and operate the trip member 35, which in turn exerts a downward pull on the main lever 31 through the medium of the wire 34 and raises the weight 33. This operation of the lever exerts a pull on the wire 27, which is connected with the latch member 22, and swings the gate-operating member 14 on its pivot to the position indicated by dotted lines in Fig. 2. This swinging of the gate-operating member operates the latch 40 to release the gate and at the same time puts the spring 16 under tension and swings the gate from its closed to its open position, when it will be engaged by the latch 37. As the gate opens the spring 11 is expanded and in this condition exerts a constant pull on the gate, tending to close the same. At the same time that the member 14 is operated the latch member will rock the rod 18 and swing the engaging end 24 of the latch member 21 downward, the latch member at the same time being moved with the member 14, which action causes its end 24 to engage the catch 10 on the latch-arm 8, thus locking the gate in its open position. The vehicle now travels forward and operates the other trip member 35, which through the medium of the intermediate connections pulls the vertical arm 25 of the lever 21 sufficiently to raise the end 24 out of engagement with the latch 10, thus releasing the gate and permitting the spring 11 to close the same. Should a vehicle be approaching the gate from the opposite direction, the mechanism will be operated in a manner similar to that above described, except that the pull on the gate-operating member will be exerted through the wire 26, connected with the latch member 21, and the rod 18 will be rocked in the opposite direction to cause the engaging end 24 of the latch member 22 to engage the latch 10 on the arm 9 for latching the gate in its open position.

The latch members 21 and 22, mounted at opposite ends of the rod 18, are so disposed relatively that when one is moved to a position for its engaging end 24 to engage one of the latches 10 the engaging end 24 of the other latch member will be rocked to an unengaging position, as clearly illustrated in Fig. 3, and the rod 18 will be held in this position by means of the spring 20, which serves to hold the rod in either of its rocked positions, owing to the crank-bend passing center.

From the foregoing description it will be seen that I produce a device which is comparatively simple, inexpensive, one which is efficient in operation, and one which may be actuated by the wheels of a passing vehicle to automatically open or close the gate, and in attaining these ends I do not limit or confine myself to the precise details herein shown and described, inasmuch as various changes may be made therein without departing from the spirit or scope of my invention. For example, instead of operating the levers 31 by a trip member 35, actuated by the wheels of a vehicle, I may employ a hand-operated lever 42, as illustrated in Fig. 4, the other parts of the device being of course similar in construction and operation to those above described.

Having thus described my invention, what I claim is—

1. The combination with a gate-post, of a gate pivoted thereto, a fixed latch-plate secured to the post, a pivoted gate-operating member operatively connected with the gate, means for operating the member to open the gate, a latch member carried by the operating member for locking the parts in the open position, and a spring operatively connecting the gate and latch-plate and adapted to automatically close the gate when the parts are released.

2. The combination with a gate-post, of a gate pivoted thereto, a fixed latch-plate secured to the post and provided with lateral arms having catches, a spring connecting the latch-plate and gate, a pivoted gate-operating member operatively connected with the gate, latch members pivoted to the gate-operating member, means for operating the member to open the gate and for simultaneously actuating one of the latch members to engage a catch on the latch-plate to maintain the gate open against the action of the spring, and means for tripping the latch member to release the gate, whereby the spring will automatically close the same.

3. The combination with a gate-post, of a gate pivoted thereto, a latch-plate fixed to the post and provided with catches, a pivoted gate-operating member, a spring connecting the same with the gate, a rock-shaft pivoted in the gate-operating member and carrying movable latch members, means for actuating the gate-operating member to open the gate and simultaneously rocking the rock-shaft to cause one of the latch members to engage one of the catches, means for releasing the gate, and a spring connecting the gate and latch-plate and adapted to automatically close the gate.

In testimony that I claim the foregoing as my own I have hereto affixed my signature in the presence of two witnesses.

PHILIP W. ROBINSON.

Witnesses:
SILVESTER S. SCOVIL,
DAVID BUTCHER.